(12) United States Patent
Schenk et al.

(10) Patent No.: US 8,179,774 B2
(45) Date of Patent: May 15, 2012

(54) CROSS-TALK COEFFICIENT UPDATING IN VECTOR TRANSMISSION

(75) Inventors: Heinrich Schenk, Munich (DE); Hansjoerg Walter Kuemmel, Munich (DE)

(73) Assignee: Lantiq Deutschland GmbH, Neubiberg (DE)

( * ) Notice: Subject to any disclaimer, the term of this patent is extended or adjusted under 35 U.S.C. 154(b) by 285 days.

(21) Appl. No.: 12/362,494

(22) Filed: Jan. 30, 2009

(65) Prior Publication Data
US 2010/0195478 A1    Aug. 5, 2010

(51) Int. Cl.
*H04J 11/00* (2006.01)
*H04B 1/00* (2006.01)

(52) U.S. Cl. .......... 370/201; 370/208; 375/148
(58) Field of Classification Search ........... 370/201, 370/208, 209; 375/148, 149, 150, 219, 224, 375/260, 267, 295
See application file for complete search history.

(56) References Cited

U.S. PATENT DOCUMENTS

| | | | |
|---|---|---|---|
| 6,208,477 B1 | 3/2001 | Cloke et al. | |
| 2002/0051487 A1* | 5/2002 | Yamada et al. | 375/232 |
| 2002/0126768 A1* | 9/2002 | Isaksson et al. | 375/298 |
| 2005/0276338 A1* | 12/2005 | Chow et al. | 375/260 |
| 2006/0146945 A1* | 7/2006 | Chow et al. | 375/260 |
| 2007/0047120 A1 | 3/2007 | DeGroat | |
| 2007/0116102 A1* | 5/2007 | Rowitch et al. | 375/148 |
| 2007/0160010 A1* | 7/2007 | Maltsev et al. | 370/332 |
| 2008/0291989 A1* | 11/2008 | Ashikhmin et al. | 375/224 |
| 2009/0016468 A1* | 1/2009 | Ghazi-Moghadam et al. | 375/340 |
| 2009/0059780 A1* | 3/2009 | De Lind Van Wijngaarden et al. | 370/201 |
| 2009/0116576 A1* | 5/2009 | Dowling | 375/267 |
| 2010/0046684 A1* | 2/2010 | De Lind Van Wijngaarden et al. | 375/363 |

FOREIGN PATENT DOCUMENTS

WO    WO2008/059406 A1    5/2008

OTHER PUBLICATIONS

Author: Marcus EK, Frank Sjöberg, Title: G.vdsl2: Pilot sequence assisted vector channel estimation, Source: Upzide Labs, International Telecommunication Union, Standardization Sector, Study Group 15—Contribution 177, COM 15—C177—E, pp. 1-6, Oct. 2006.
Author: George Ginis, John M. Cioffi, Title: Vectored Transmission for Digital Subscriber Line Systems, IEEE Journal on selected areas in communications, pages No. 1085-1104, vol. 20, No. 5, Jun. 2002.
Author: Raphael Cendrillon, Marc Moonen, Etienne Van den Bogaert, George Ginis, Title: The Linear Zero-Forcing Crosstalk Canceler is Near-optimal in DSL Channels, IEEE Communications Society, Globecom 2004, pp. 2334-2338.
Upzide Labs: "G .vdsl2: Pilot sequence assisted vector channel estimation" ITU-T Study Group 15—Contribution 177; COM IS—C 177—E, vol. COM 15—C 177—E, Oct. 1, 2006, pp. 1-6, XP002S0S924.
Upzide Labs: "G.vds12: Upzide's answers to Adtran's vectoring questions" ITU-T Study Group IS—Contribution 518; COM IS—C 519—E, vol. COM 15—C 519—E, May 2007, pp. 1-9, XP002588446.

* cited by examiner

*Primary Examiner* — Chi Pham
*Assistant Examiner* — Prince Mensah
(74) *Attorney, Agent, or Firm* — SpryIP, LLC

(57) ABSTRACT

Embodiments related to far-end cross-talk coefficient updating in vector transmission systems are depicted and described herein.

21 Claims, 11 Drawing Sheets

$$H_8 = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix}$$

*Fig. 3a*

|   |   | Channel 1 | Channel 2 | Channel 3 | Channel 4 | Channel 5 | Channel 6 |
|---|---|---|---|---|---|---|---|
| 0 | 0 | 1 | 1 | 1 | 1 | 1 | 1 |
| 1 | 1 | -1 | 1 | -1 | 1 | -1 | 1 |
| 2 | 2 | 1 | -1 | -1 | 1 | 1 | -1 |
| 3 | 3 | -1 | -1 | 1 | 1 | -1 | -1 |
| 4 | 4 | 1 | 1 | 1 | -1 | -1 | -1 |
| 5 | 5 | -1 | 1 | -1 | -1 | 1 | -1 |
| 6 | 6 | 1 | -1 | -1 | -1 | -1 | 1 |
| 7 | 7 | -1 | -1 | 1 | -1 | 1 | 1 |
| 8 | 0 | 1 | 1 | 1 | 1 | 1 | 1 |
| 9 | 1 | -1 | 1 | -1 | 1 | -1 | 1 |
| 10 | 2 | 1 | -1 | -1 | 1 | 1 | -1 |
| 11 | 3 | -1 | -1 | 1 | 1 | -1 | -1 |
| 12 | 4 | 1 | 1 | 1 | -1 | -1 | -1 |
| 13 | 5 | -1 | 1 | -1 | -1 | 1 | -1 |
| 14 | 6 | 1 | -1 | -1 | -1 | -1 | 1 |
| 15 | 7 | -1 | -1 | 1 | -1 | 1 | 1 |

Rows 0–7: Orthogonal sequence No 1
Rows 8–15: Orthogonal sequence No 2

Hadamard Sequences for 6 channels
number of Hadamard symbol
pilot symbol number

*Fig. 3b*

CROSS-TALK COEFFICIENT UPDATING IN VECTOR TRANSMISSION

BACKGROUND

In many data communication systems data are transmitted by modulating digital data onto carriers. Such data transmission systems include single-carrier data communication systems such as QAM (Quadrature amplitude modulation) or PSK (Phase shift keying) and multi-carrier system using a plurality of subcarriers such as OFDM (Orthogonal frequency division multiplexing) or DMT (Discrete multitone modulation) to transmit data on multiple frequency bands.

Vector data transmission (sometimes referred to as vectoring or vectored data transmission) is a technique for coordinated transmission of data from a plurality of transmitters to a plurality of receivers via a plurality of transmission links (transmission channels) in order to improve the transmission. Vector transmission for example reduces the influence of cross-talk by providing compensation or precompensation of the cross-talk induced onto the signal during transmission over the link. Vectoring is sometimes also referred to as Spectrum Management Level 3.

One type of cross-talk appearing in such transmission systems is the so called FEXT (far end cross-talk). For example in Very High Speed Digital Subscriber Line (VDSL) systems, FEXT can possibly be a major source of performance degradation. Typically for such transmission systems, data are transmitted from a central unit such as a central office (CO) or other provider equipment to a plurality of receivers located in different locations, for example in customer premises (CPE), via a plurality of communication channels. FEXT resulting from signals on different channels (lines) transmitted in the same direction results in a reduced data throughput. Through vectoring, signals transmitted over the plurality of communication channels from the central office or received via the plurality of communication channels in the central office may be processed jointly in order to reduce such cross-talk. In this respect, the reduction of cross-talk by coordinated transmission of signals is sometimes referred to as cross-talk precompensation, whereas the reduction of cross-talk through joint processing of the received signals is sometimes referred to as cross-talk compensation or cross-talk cancellation. The communication channels which are processed jointly are sometimes referred to as vectored group. Thus, to reduce or eliminate the FEXT influence, FEXT compensation can be used for upstream communication and FEXT precompensation can be used for downstream communication.

For this kind of cross-talk reduction cross-talk coefficients which are parameter describing the cross-talk between communication connections have to be determined and are thereafter stored in order to use these parameters for cross-talk compensation or cross-talk precompensation. Cross-talk coefficient can be learned for example during an initialization of the system or during a joining of a new line to the vector group. During operation (showtime) of the system, the cross-talk coefficients are tracked. Learning as well as tracking require both a determining of the cross-talk coefficients and an updating of the previously stored cross-talk coefficients.

BRIEF DESCRIPTION OF THE SEVERAL VIEWS OF THE DRAWINGS

FIGS. 3a to 3d show sequences according to embodiments;

DETAILED DESCRIPTION

The following detailed description explains exemplary embodiments. The description is not to be taken in a limiting sense, but is made only for the purpose of illustrating the general principles of embodiments while the scope of protection is only determined by the appended claims.

In the various figures, identical or similar entities, modules, devices etc. may have assigned the same reference number.

Figure 1A:
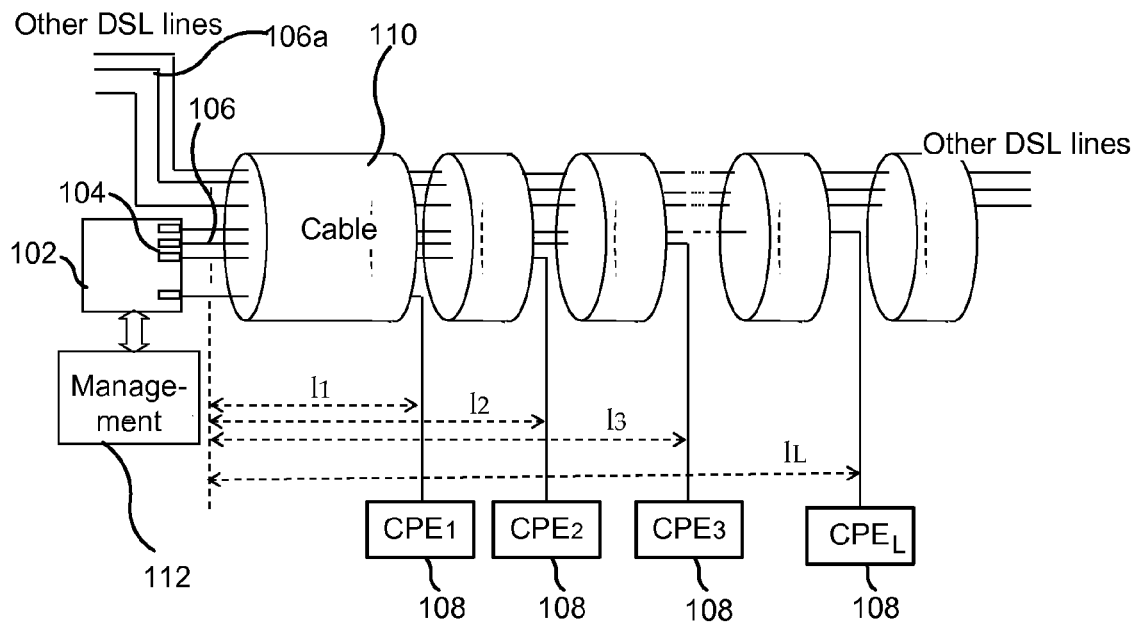
FIG. 1a shows a block diagram according to an embodiment.

Referring now to FIG. 1a, an exemplary embodiment of a vector transmission system 100 is shown. In the following detailed description, exemplary embodiments are described with respect to a VDSL vector transmission system. It is to be noted however that the VDSL vector transmission system is only an exemplary embodiment of a vector transmission system and that vector transmission system 100 can be of any other type. Furthermore, it is to be understood that the subscriber lines of the VDSL vector transmission system are only one representation of channels of a vector transmission system and that other embodiments may use other communication channels.

The VDSL vector transmission system comprises a DSLAM (Digital Subscriber Line Access Multiplexer) 102 having a plurality of first transceiver units 104 which are coupled to a plurality of channels (lines) 106. Each of the channels of the plurality of channels may for example be implemented as twisted pair wire. DSLAM 102 may be implemented in an Optical Network Unit (ONU) such as a Central Office (CO), a cabinet, an exchange or other types of network termination devices at the operator's end.

Each of the plurality of channels 106 connects the first transceiver units 104 at the operator's end with a respective second transceiver unit 108 at a subscriber end. The first transceiver units 104 are implemented to form with the second transceiver units 108 and channels 106 a vector transmission system. The second transceiver units 108 may for example be integrated in a costumer premise equipment (CPE) such as a home gateway, a router etc. The second transceiver units 108 may be located at different distances with respect to the transceiver units 104 such that the number of channels provided in a cable bundle or cable 110 is decreasing with increasing distance from the first transceiver units 108 as shown in FIG. 1a. It is however to be noted that the second transceiver units 108 may in other embodiments have a same or nearly a same distance from the first transceiver units.

At the operator's side, a management entity 112 may be provided to provide management functions such as spectrum management. As will be described later, the management entity 112 may perform also coordination functionality for transmitting symbol sequences for FEXT probing as will be outlined in more detail below.

While the cable may contain only channels of the vector transmission system, it is to be noted that in some embodiments further lines which are not part of the vector transmission system, for example ADSL lines, SDSL lines or ISDN lines, which are designated in FIG. 1a with reference number 106a may be provided in the cable 110. As shown in FIG. 1a, the further lines 106a may terminate at other operator or subscriber termination locations. For example, the VDSL line may be terminated at a cabinet while the ADSL lines may be terminated at a Central Office. According to other embodiments of the present invention, all of the channels provided in the cable 110 may be connected to the first transceiver units. In such embodiments, all of the channels of the cable may be transmission channels of the vector transmission system while in the embodiment shown in FIG. 1a, only the channels connected to the first transceiver units 104 may be transmission channels of the vector transmission system.

Distortion of the data transmission on the vector transmission system occurs mainly by two types: distortions which are generated by the vector transmission itself also known as FEXT or self-FEXT and distortions from outside of the vector transmission system also known as alien noise.

While the alien noise typically can not be compensated, the FEXT distortions of the vector transmission system can be compensated by having knowledge of the signals, i.e. of the data transmitted over the channels of the vector transmission system.

In upstream direction all of the data send over the channels 106 terminate at one of the first transceiver units 104 of DSLAM 102. Therefore, at the receiver side, i.e. at the DSLAM, access to all data transmitted over the channels 106 can be provided and compensation can be provided in upstream direction utilizing this data information.

In downstream direction, the data send over the channels 106 are received at the respective second transceiver units 108 which are typically placed at different locations. Typically, no channel between the receiving devices at the different subscriber locations is available. In this case, compensation at the subscriber's end can not be provided as the transceiver unit 108 at one subscriber has no information of the data send to the transceiver unit 108 at another subscriber.

Reduction or elimination of the FEXT can be achieved in this case by using a technique known as precompensation. In precompensation, which is also known as preceding or precancellation, the effect of cross-talk experienced by a signal during transmission is computed or estimated prior to transmitting the signal and the signal is modified based on this information for example by subtracting the calculated cross-talk from the transmission signal or adding the negation of the calculated cross-talk. Then, during the transmission, the transmission signal is exposed to the cross-talk, i.e. the cross-talk adds to the transmission signal resulting in the receiving of the original or nearly original, i.e. unmodified or nearly unmodified signal as provided at the transmitting side except of some other noise added during the transmission.

For both cross-talk compensation techniques, cross-coupling coefficients indicating the strength of cross-talk between each respective line is required.

In VDSL, data are transmitted using a multicarrier transmission known as DMT (discrete multitone transmission). Each of the frequency bands provided for data transmission is divided into a plurality of non-overlapping subcarriers (tones). For each subcarrier, data bits to be transmitted are represented by a complex number selected of a plurality of predefined complex numbers in a constellation space. The complex number is sometimes referred to as a constellation vector, a constellation point or a subcarrier symbol. For example, if a 4-QAM (Quadrature Amplitude Modulation) is used for subcarrier k, the complex number is selected from the predefined set of $\{1+j, 1-j, 1+j, -1-j\}$ where j is the imaginary unit. The complex number of each subcarrier is then transferred to a inverse Fourier transformation unit where a time domain representation is generated by an inverse Fourier transformation also known as DMT symbol.

Figure 1B:
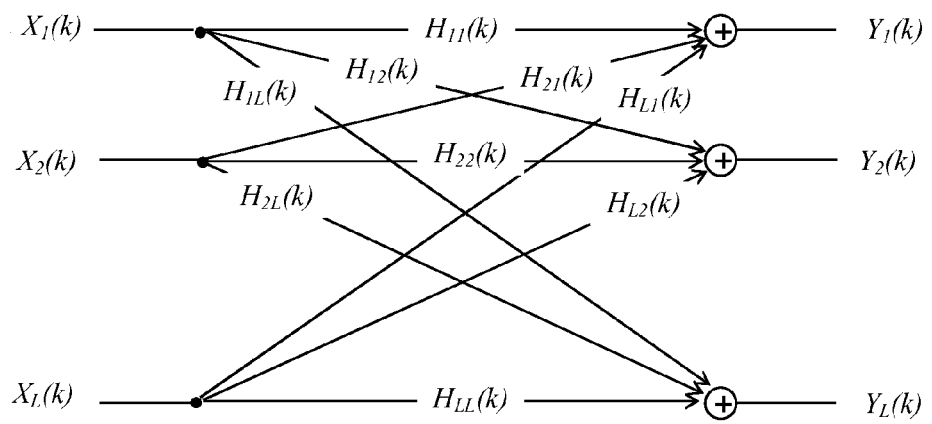
FIG. 1b shows a schematic view according to an embodiment.

In the above Vector transmission system, FEXT compensation may be provided independently of the other subcarriers. A model showing the cross-talk for one of the plurality of subcarriers in a vector transmission system is shown in FIG. 1b. While FIG. 1b shows the model for one subcarrier, it is to be noted that the model can be applied to each other subcarrier of a DMT system. It is also to be noted here that the above model can also be applied to a system wherein on each channel a single carrier modulation is used.

For each subcarrier, the transmission can be described by a MIMO (Multiple In Multiple Out) system wherein the transmission system is represented by a transmission matrix H. Diagonal coefficients $H_{ii}$ of the matrix H which are also known as line coupling coefficients define the attenuation and distortion due to the line characteristics of line i. Off-diagonal coefficients $H_{i,j}$ represent the FEXT transmission functions and define the FEXT coupling from line i to line j. As outlined above, the FEXT coefficients for the respective subcarriers are required for FEXT (pre)compensation.

The transmission matrix H(k) for a subcarrier k with L transmission channels is mathematically represented according to the above model by $$H(k) = \begin{bmatrix} H_{11}(k) & H_{12}(k) & H_{13}(k) & \ldots & H_{1L}(k) \\ H_{21}(k) & H_{22}(k) & H_{23}(k) & \ldots & H_{2L}(k) \\ H_{31}(k) & H_{32}(k) & H_{33}(k) & \ldots & H_{3L}(k) \\ \vdots & \vdots & \vdots & & \vdots \\ H_{L1}(k) & H_{L2}(k) & H_{L3}(k) & \ldots & H_{LL}(k) \end{bmatrix}$$

As outlined above, in the matrix H(k), the coefficients $H_{i,j}$ with $i \neq j$ correspond to the FEXT coefficients $FEXT_{i,j}$ while the diagonal coefficients $H_{i,i}$ correspond to the line coefficients of channel i determining the transfer function of the transmitted signal on channel i.

In order to provide FEXT compensation, the coefficients of matrix H(k) have to be determined (estimated). This is accomplished according to embodiments of the present invention by transmitting a sequence of symbols from the plurality of transceiver units 104 to the plurality of transceiver units 108 or from the plurality of transceiver units 108 to the plurality of transceiver units 104 and utilizing only a subgroup of the transmitted symbols for providing the updating of the coefficients. As will be described below in more detail, in embodiments the sequence of symbols is a sequence based on a modulation of a predetermined symbol with an orthogonal sequence. The sequence may be a sequence of pilot symbols (SYNC symbols) which are based on a modulation of a predetermined symbol with an orthogonal sequence. Updating of cross-talk coefficients (cross coupling coefficients) is then performed by utilizing only a selected subset of the sequence of pilot symbols. As will be described below in more detail, each of the selected symbols received at a transceiver unit 108 is measured and compared to a predetermined reference to determine a receive error (slicer error). The slicer error may be error-based such that the slicer error represents the complex vector indicating in the constellation diagram the difference between the received symbol and the original transmitted symbol. In other embodiments, the slicer error may be decision based. Here, the slicer error indicates the sign of the error for the real and/or imaginary part. In some embodiments, a change from an error-based to a decision-based slicer error may occur during initialization or operation. The slicer error from the plurality of transceiver units 108 is then used to estimate the FEXT coupling coefficients.

As outlined above, the probing (testing) and estimating of the cross-talk for a respective subcarrier is independent to the probing and estimating for other subcarriers. Therefore, the selection of sequences for one subcarrier is independent of the selection of sequences for any other subcarrier. For example, according to embodiments, the same sequences can be used for each subcarrier or different sequences can be used for the respective subcarriers. Furthermore, it is to be noted that the above cross-coupling probe signals for one subcarrier may be used for a single-carrier system wherein only one carrier is used.

Figure 5:
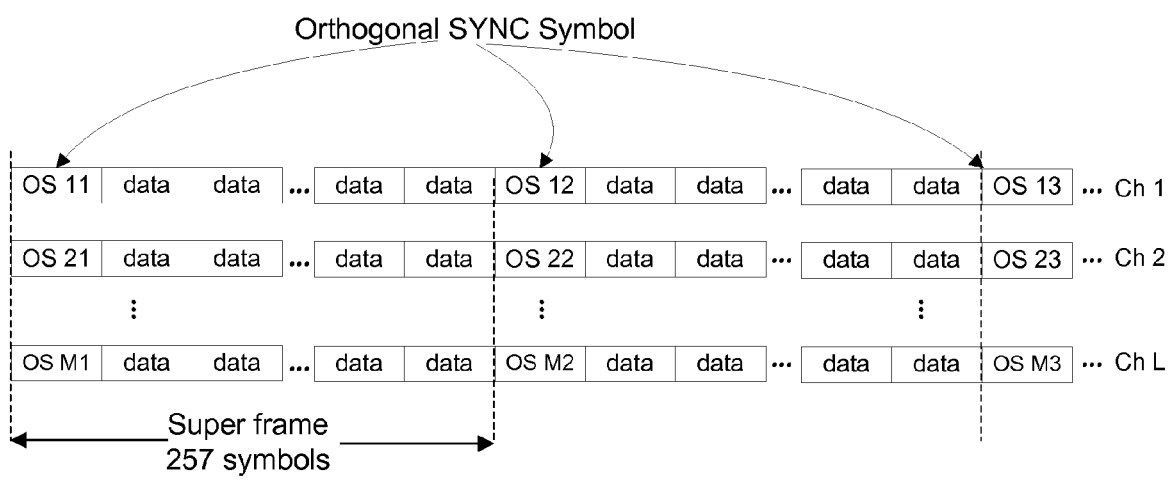
FIG. 5 shows transmission symbols according to embodiments.

According to one embodiment, the sequence of symbols transmitted are a sequence of pilot signals representing synchronization symbols (SYNC symbols) which are provided in an assemble of data frames also known as a superframe. As shown in FIG. 5, for each channel 1 to L of the sequence of symbols may be a sequence of SYNC symbols OS provided every 257th transmitted symbol allowing to transfer 256 data symbols representing user data in between. SYNC symbols and data symbols may be both DMT symbols, i.e. a representation of all subcarriers used for DMT modulation.

According to embodiments, the sequence of SYNC symbols transmitted in time on each channel is generated based on a modulation of predefined SYNC symbols or SYNC words $u_0$ with a respective orthogonal sequence. After the end of the sequence modulated by an orthogonal sequence, the sequence is repeated for each channel.

The sequence $[x(t1) \ldots x(tN)]$ of SYNC symbols in time transmitted on a channel can be written as the product (multiplication) of a predetermined SYNC symbol $u_0$ and the orthogonal sequence $[s(t1) \ldots s(tN)]$, i.e. $[x(t1) \ldots x(tN)] = u_0 [s(t1) \ldots s(tN)]$. It is to be noted that in an embodiment orthogonal sequences modulate the sign of SYNC symbols. The orthogonal sequences may be periodical and may have the same length, but they are different by contents and orthogonal to each other.

Two sequences s' and s'' are considered pure orthogonal when the dot product $s'(t1) \cdot s''(t1) + s'(t2) \cdot s''(t2) + s'(t3) \cdot s''(t3) + s'(t4) \cdot s''(t4) \ldots + s'(tN) \cdot s''(tN)$ of the two sequences (or vectors formed by the sequences s' and s'') is zero while the dot product of the sequence s' with itself and the dot product of the sequence s'' with itself are non-zero. According to one embodiment, the orthogonal sequences are columns or rows of a Hadamard Matrix. A Hadamard matrix is a pure orthogonal matrix which contains only +1 and −1 such that any column (or row) is orthogonal to each other column (or row). Columns (or rows) of Hadamard matrixes are sometimes referred in the art as Walsh-Hadamard sequences or Walsh sequences.

It is to be noted that in some embodiments orthogonal sequences may also include what is known as pseudo-orthogonal sequences which are sequences wherein the dot product does not yield exactly zero but a small remainder in the order of one element of the sequence. One example of pseudo-orthogonal sequences is two m-sequence which are shifted against each other. A m-sequence is a pseudonoise sequence known in the art with specific autocorrelation properties. M-Sequences can be generated by using a feedback shift register. Thus, as used herein, the term "orthogonal" is to be interpreted as including both "pure orthogonal" and "pseudo-orthogonal".

The above described SYNC symbol sequences provided by modulation (multiplication) of a predetermined SYNC symbols with orthogonal sequences may be regarded as a representation of orthogonal sequences weighted by the predetermined symbol. This means that the orthogonal sequences, for example rows or columns of a Hadamard matrix, are multiplied for each subcarrier by the respective complex constellation vector (constellation point) of the predetermined SYNC symbol. Using Hadamard sequences as orthogonal sequences, the predetermined or regular SYNC symbol is multiplied at each SYNC transmission position either with +1 or −1 based on the value of the orthogonal sequence element corresponding to the number of the transmission position.

The predetermined complex SYNC symbol may in an embodiment be selected for each subcarrier from the 4 constellation points of a 4-QAM modulation representing the bit sequences 00, 01, 10 and 11. The predetermined SYNC symbols can be different for each subcarrier.

It is to be noted that the SYNC symbol sequences transmitted on all channels of the vector transmission system are made orthogonal (pure orthogonal or pseudo-orthogonal) by multiplying the predetermined SYNC symbol with the orthogonal sequences and are therefore statistically independent. This allows using the SYNC symbol sequences as pilot signals as well as probing signals for fast estimation or acquisition of the FEXT coupling coefficients between the channels for example when a new line joins the vectored group or a fast updating of the coefficients of the FEXT cancellation matrix in an already existing vectored group.

FIG. 5 shows an embodiment of the transmission of orthogonal modulated SYNC symbol sequences in vectored DSL channels. As can be seen, the SYNC symbols for each orthogonal SYNC symbol sequence is transmitted on each channel (line) at the same time, i.e. at the same time slot. Between two consecutive SYNC symbols, data symbols are transmitted. In one embodiment of a VDSL system, the number of data symbols between consecutive SYNC symbols may be 256. The data symbols and the SYNC symbols form then a structure known as a super-frame.

In view of the above, in FIG. 5 the symbol sequence OS11 . . . OS1n of Channel 1 may be therefore be the result of the multiplication of a first row of the Hadmard matrix with a predetermined SYNC symbol u0. The symbol sequence OS21 . . . OS2n may be the result of the multiplication of a second row of the Hadamard matrix with the predetermined SYNC symbol u0 etc. For each channel the overall symbol sequence may then obtained by periodically repeating the respected symbol sequence obtained by multiplication of the respective row of the Hadamard matrix with the predetermined SYNC symbol u0.

In order to estimate or determine the transmission matrix H, a slicer error is determined at the respective receiver side based on the received signal. For determining the cross-talk coefficients of matrix H for upstream communication frequencies (subcarriers), the transceivers 104 at the Central Office side have to perform the slicer error measurement while for determining the matrix coefficients for downstream communication frequencies (subcarriers), each of the transceivers 108 at the respective CPE sides have to perform the slicer error measurement. The corresponding receiver units are therefore operable to receive a sequence of signals and to determine a slicer error by comparing the sequence of received signals with a reference. The reference for the received sequence of symbols is the expected sequence of SYNC symbols which is equal to the transmitted SYNC symbol sequence. Updating of the cross-talk coefficients $H_{i,j}$ is then based on the measured slicer error.

In more detail, each transceiver unit measures each of the cross-talk probe signals (SYNC symbol signal) received and demodulates the signal by equalizing the signal and Fourier transforming the equalized signal. Equalizing the signal provides compensation for the signal attenuation on the respective channel represented by the diagonal coefficients of matrix H. Finally, a received complex number (symbol in the constellation space) is obtained. Due to the cross-talk effects and the alien noise experienced during the transmission, the received complex number and the original send complex number in the constellation space deviate from each other.

The coefficients of Matrix H(k) are then determined from the measured receive signal by estimating a receive error (which will be also referred to as slicer error) of the receive signal Y which indicates a deviation of the received signal from an expected constellation point. The slicer error may in some embodiments only include the sign of the difference between the original transmitted and the received symbol signal as outlined below.

If the cross-talk probe signals, i.e. the orthogonal sequence of symbols is transmitted at a time t1 on all of a plurality of L channels are represented by a sender vector $$\vec{x}(t1) = \begin{bmatrix} x_1(t1) \\ x_2(t1) \\ ... \\ x_L(t1) \end{bmatrix}^T$$

where T indicates the transposed vector then the sequence of the cross-coupling probe signals transmitted at time slots t1, t2, ... tN on all of the plurality of L channels can be obtained by a matrix $$X = \begin{bmatrix} x_1(t1) & x_1(t2) & ... & x_1(tN) \\ x_2(t1) & x_2(t2) & ... & x_2(tN) \\ ... & ... & ... & ... \\ x_L(t1) & x_L(t2) & ... & x_L(tN) \end{bmatrix}^T$$

where T indicates a transposed matrix.
Similar, the sequence received at the receiver on all of the L channels at the time slots t1, t2, ... tN can be written as a matrix $$Y = \begin{bmatrix} y_1(t1) & y_1(t2) & ... & y_1(tN) \\ y_2(t1) & y_2(t2) & ... & y_2(tN) \\ ... & ... & ... & ... \\ y_L(t1) & y_L(t2) & ... & y_L(tN) \end{bmatrix}^T.$$

The receive matrix Y can be obtained by multiplying the sender Matrix X with the transmission matrix H and adding a matrix A which takes into account the alien noise added during the transmission: $Y = XH + \Delta$.

The matrix representing the equalized receive error can then be expressed by $Z = Y(H_d)^{-1} - X = XH(H_d)^{-1} - X + \Delta(H_d)^{-1} = XF + \Delta(H_d)^{-1}$ where $H_d^{-1}$ represents a diagonal matrix having as coefficients the diagonal coefficients $H_{ii}$ of matrix H which is sometimes referred to as frequency equalizer (Feq) and F represents the equalized cross-coupling matrix without the transmit coefficients $H_{ii}$, i.e. all diagonals are zero.

Assuming a uniform distribution of the alien noise and using a least square estimate, the estimate $\hat{F}$ of the cross-coupling matrix H can be expressed by $$\hat{F} = (X^{*T}X)^{-1}X^{*T}Z \qquad \text{[Equation 1]}$$

where $X^{*T}$ represent the transposed and complex conjugated matrix of matrix X and $(X^{*T}X)^{-1}$ is the inverse of the autocorrelation matrix $(X^{*T}X)$.

By using orthogonal sequences as described above, the estimated cross-talk matrix can be calculated in a simple way since $(X^{*T}X)^{-1}$ is for a modulation with orthogonal sequences proportional to the unity matrix and convergence of the cross-talk is reached faster and easier. For example, assuming that $X = u_0 S$, where S is an orthogonal Walsh-Hadamard matrix and $u_0$ is a predetermined SYNC symbol, $(X^{*T}X)^{-1}$ becomes equal to $|u_0|^2 (S^T S)^{-1}$.

While for some operation it may be useful to determine for each transmitted SYNC symbol a slicer error and feed the slicer error as cross-talk update information to the management unit 112 for updating the cross-talk coefficients of matrix H, it may be useful to have also operation modes with selectable lower rates of updating the cross-talk coefficients. For example, while it may be useful to provide a training with a high update rate in situations when the coefficients have to be quickly learned for example during a start of the vector transmission system or during a line joining of a new line (a new line starts operation), it may be useful after a successful learning of the coefficients to provide lower update rates for tracking the coefficients during data mode. Such an operation mode may for example include but not limited to a so called tracking mode. Embodiments described in the following provide a concept allowing a flexible update rate while still having the benefit of the easy calculations as described above.

The embodiments presented below use orthogonal symbol sequences as cross-talk probe signals and lower or change an update rate of cross-talk coefficients without changing the rate at which the orthogonal symbols are transmitted. Rather than changing the rate at which the probe symbols are transmitted, in the concept described below a careful selection of a subsequence of the transmitted orthogonal symbols is performed by using a predetermined selection scheme. With the predetermined selection scheme, it is possible to construct from the transmitted orthogonal sequence of symbols a sub-sampled sequence of symbols at a lower rate. With the predetermined selection scheme, the subsampled sequence of symbols are also obtained again to be an orthogonal sequence. The rate of update information can therefore be lowered or changed while still providing always a sequence of update information to the management unit which is derived from an orthogonal sequence, i.e. the subsampled sequence.

Figure 2:
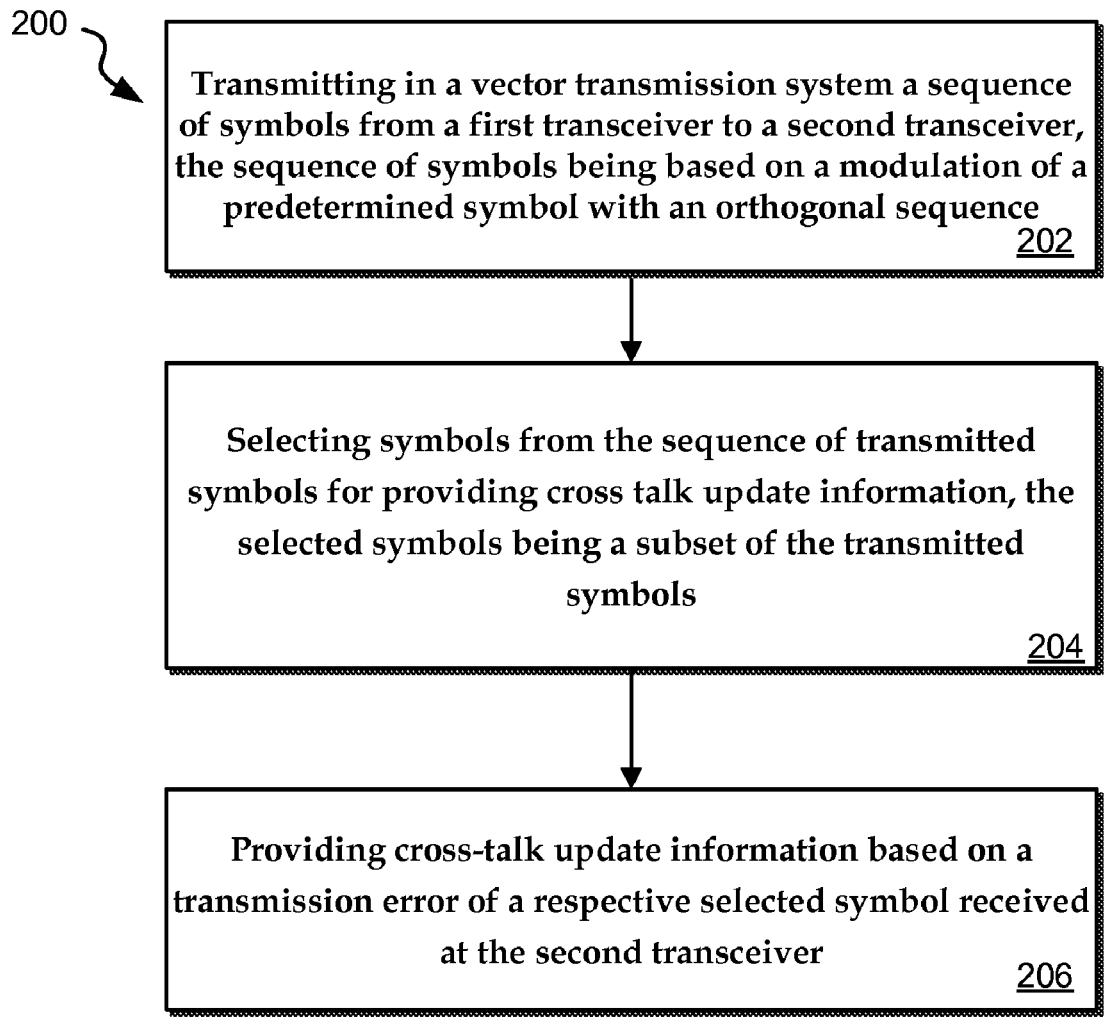
FIG. 2 shows a chart diagram according to an embodiment.

A general flow diagram 200 according to one embodiment will be explained now with respect to FIG. 2.

At 202, a sequence of symbols is transmitted in a vector transmission system from a first transceiver to a second transceiver, the sequence of symbols being based on a modulation of a predetermined symbol with an orthogonal sequence. The orthogonal sequence used for each channel of the vector transmission system is one sequence of a set of mutually orthogonal sequences. In embodiments, the transmitted symbol sequence is obtained by providing for each channel an orthogonal symbol sequence and repeatedly transmitting the orthogonal symbol sequence over the respective channels. The orthogonal symbol sequence is obtained by multiplying an orthogonal sequence with a predetermined symbol, i.e. $\vec{x}(t1) = (x_1(t1), x_1(t2), ... x_N(tN)) = u_0 \Box (s_1(t1), s_1(t2), ... s_N(u_0 s_1(t1), u_0 s_1(t2), ... u_0 s_N(tN))$. The transmitted symbol sequence represents in embodiments a pilot symbol sequence transmitted at predetermined synchronization time slots. Between two successively transmitted symbols of the sequence, other symbols representing user data may be transmitted.

At 204, symbols are selected from the sequence of transmitted symbols for providing cross-talk update information based on a transmission error of the selected symbols. The selected symbols are a subset of the transmitted symbols, i.e. only a part of the transmitted symbols are selected. As will be described in more detail below, in embodiments the selection is provided by a predetermined scheme such that the sequence of the selected symbols is again an orthogonal sequence. Thus, when using the same scheme for each channel, the sequence of selected symbols for one channel is orthogonal to the sequence of selected symbols on each other channel.

In one embodiment, the selection is a continuous selection of every kth symbol wherein k is an odd integer which may be selected and thereafter maintained. The selection is provided continuously over the sequence at least until as many symbols are selected number as the size N of the orthogonal sequence is. The subsampling may extend however much longer than until the N symbols are selected. In one embodiment, the size N of the orthogonal sequence is equal to $2^n$ where n is an integer number. In one embodiment, the orthogonal sequence is a pseudo-orthogonal sequence of size $2^n-1$.

Cross-talk update information may be regarded as information which is provided for updating a FEXT cross-talk coefficient for example when learning or tracking cross-talk coefficients of the vector transmission system. Typically, when updating a cross-talk coefficient, an old cross-talk coefficient is replaced by a new cross-talk coefficient. The new cross-talk coefficient may be calculated by using techniques such as LMS (least mean square) or other updating techniques known in the art. The cross-talk update information may be in embodiments the slicer-error of the transmitted symbol. Slicer error may be the difference vector of the original transmitted symbol and the received symbol or only the sign of the transmission error (sign of real part and/or sign of imaginary part of the error).

At 206, cross-talk update information is provided based on a transmission error of a respective selected symbol received at the second transceiver. By selecting the symbols, only the transmission error of the selected symbols is taken into account for updating while the transmission error occurred for non-selected symbols is not taken into account when updating the FEXT coefficients. Therefore, the bandwidth required for transmitting the update information and the amount of computation required for updating is reduced compared to the operation mode in which update information is provided based on the transmission error for each transmitted symbol.

In the following, more detailed embodiments will be described based on using Hadamard sequences as orthogonal sequences. However, it should be understood that the embodiments described herein are not limited to these type of orthogonal sequences and other orthogonal sequences may be used as well.

As described above, a Hadamard sequence is a sequence obtained from a row (or a column) of a Hadamard matrix. For sizes N that are powers of two, i.e. $N=2^n$, the Hadamard matrix can be constructed as follows:

$$H_2 = \begin{bmatrix} 1 & 1 \\ 1 & -1 \end{bmatrix}$$

$$H_{2n} = \begin{bmatrix} H_n & H_n \\ H_n & -H_n \end{bmatrix}$$

The characteristics of Hadamard matrixes are:
$H_N^T = H_N$ where $H_n^T$ is the transposed matrix and
$H_N \cdot H_N = N \cdot I(N)$ where $I(N)$ is the Identity matrix.

Figure 3C:
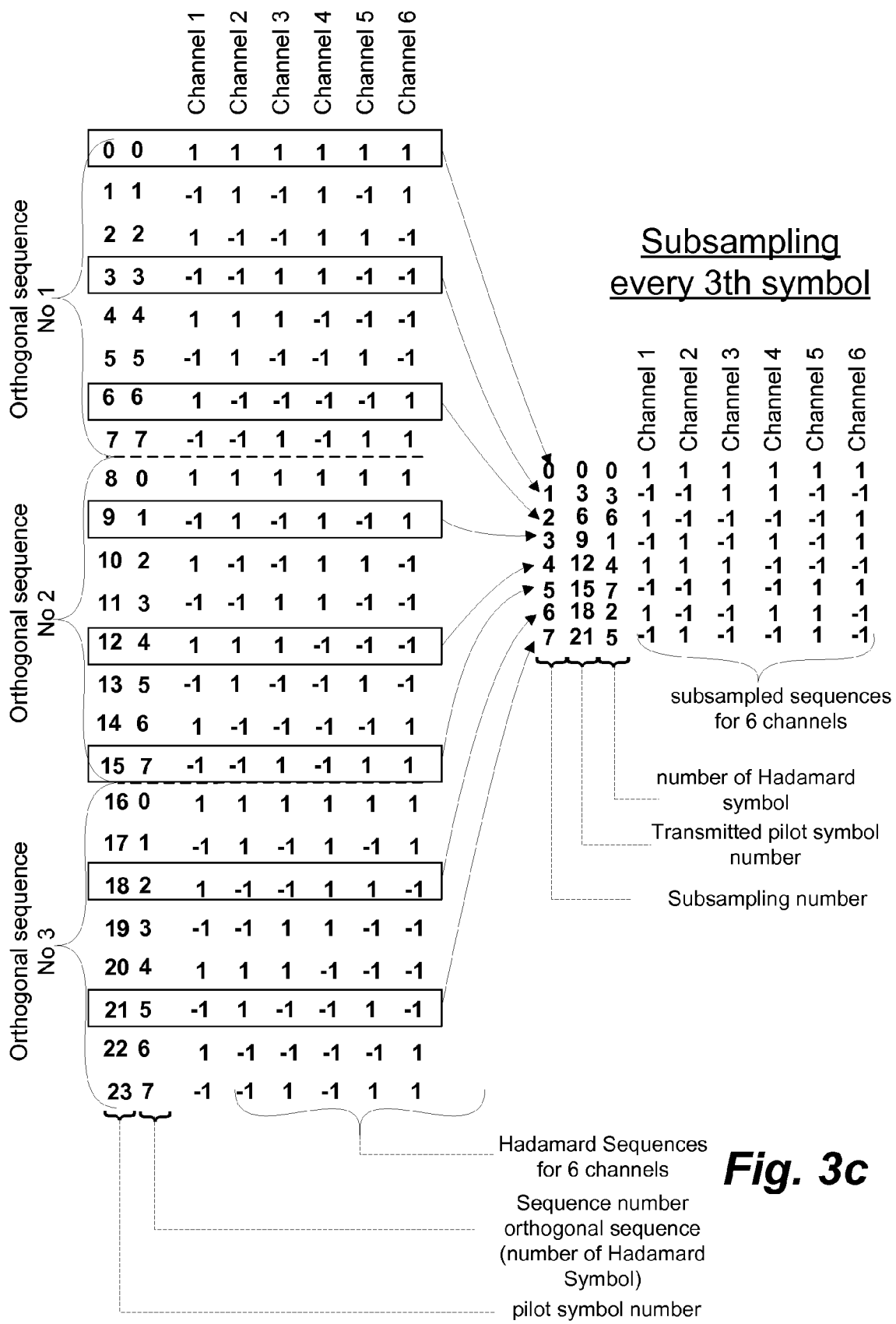

For illustration purposes, FIG. 3a shows an example of a Hadamard matrix of size N=8. It can be easily seen that each row of the Hadamard matrix is orthogonal to each other row as well as each column is orthogonal to each other column.

FIG. 3b shows an embodiment of constructing pilot symbol sequences for 6 channels based on the Hadamard matrix of size 8. The pilot symbol sequences may for example be used as SYNC symbol sequences in a superframe structure as described with respect to FIG. 5. In order to construct an orthogonal sequence, 6 Hadamard sequences (either rows or columns) are selected from the Hadamard matrix. In the exemplary embodiment of FIG. 3b, the columns 2 to 7 have been chosen as orthogonal basis for the channels 1 to 6. On each channel, after one Hadamard sequence is completed, the Hadamard sequence for the respective line is repeated periodically. It is to be noted that FIG. 3b shows the orthogonal sequence of the Hadamard symbols having values of 1 or −1. As described above, for providing a symbol sequence based on the orthogonal sequence, each orthogonal sequence is multiplied with a predetermined complex symbol $u_0$.

In order to provide a reduced update rate, update information is generated based on a transmission error only for a subsampled sequence of the transmitted symbol sequence.

Embodiments described herein use predetermined selection schemes (subsampling schemes) which allow to regularly subsample the transmitted symbol sequences such that the subsampled sequences are again orthogonal sequences. In other words, a subsampled sequence Sub-S1 is orthogonal to each other subsampled sequence Sub-S2, Sub-S3 . . . of the other channels of the vector transmission system and fulfills the identity requirement when performing a multiplication with itself.

In the following, it will be shown that continuously subsampling each of a set of orthogonal sequences of size $2^n$ every $k^{th}$ symbol will result in a set of sub-sampled sequences which are orthogonal if k is an odd integer number. Contrary, if k is an integer even number, the set of sub-sampled sequences are not obtained to be orthogonal to each other when subsampling every $k^{th}$ symbol is provided continuously.

In the following it is first shown that a change of the order consistently performed in all sequences will not affect the orthogonality while a replacement of one by another will not maintain the orthogonality. As outlined above, the dot product of two sequences S' and S'' is obtained by s'(1)·s''(1)+s'(2)·s''(2)+s'(3)·s''(3)+s'(4)·s''(4) . . . +s'(N)·s''(N). Exchanging the sequence order consistently in both sequences will not affect the dot product. For example exchanging s'(2) with s'(3) and s''(2) with s''(3) in sequences S' and S'' will not affect the dot product since in both cases the sum s'(2)·s''(2)+s'(3)·s''(3) is the same. However, when replacing at least one of the sequence value with another sequence value, i.e. repeating one of the sequence numbers at least twice while omitting one sequence value, orthogonality can in general not be maintained. For example, if instead of exchanging number 2 and number 3 consistently in all sequences, the value of sequence number 3 is replaced consistently for all orthogonal sequences by the value of sequence number 2 such that the sequence reads s(1), s(2), s(2), s(4) then the dot product would read s'(1)·s''(1)+s'(2)·s''(2)+s'(2)·s''(2)+s'(4)·s''(4) . . . +s'(N)·s''(N). If the replacement is consistently for all sequences of the set of orthogonal sequences, then orthogonality for all sequences of the set of orthogonal sequences can not be maintained in general.

In the following, it is assumed that a set of sequences is constructed by periodically repeating a respective orthogonal sequence having size N. From the above it can be concluded that in subsampling each sequence of such a set of sequences with the same predetermined rule, orthogonality of the subsampled sequences is only maintained when the sequence numbers of the orthogonal sequences do not repeat until N symbols are selected (sampled). Or in other words, when selecting the subsampled symbols from the sequence N times, all of the N different symbols (symbols numbers) of the orthogonal sequence (being the basis for constructing the sequence) have to appear once in the N subsampled sequence numbers.

For a set of sequences constructed by regularly repeating respective orthogonal sequences of size $2^n$, it will be showed in the following that a continuously regular subsampling of every $k^{th}$ sequence value (i.e. a subsampling where the number of samples between two subsampled numbers is maintained constant to (k−1)) only maintains orthogonality if k is an odd value. In other words, when continuous regular sampling is provided, only subsampling every odd sequence value (such as every $3^{rd}$ or every $5^{th}$, etc.) maintains orthogonality while subsampling every even sequence value (such as every $2^{nd}$, or every $4^{th}$, etc) will not preserve orthogonality of the sequences. In order to show the validity of this rule one can start with reformulating the requirement for orthogonality of the subsampled sequence in view of the above as follows. Assuming that in the subsampled sequences one of the subsampled sequence numbers of the sequence repeats the first time after m subsampled values, then the subsampled sequence is orthogonal if m is equal to the size of the orthogonal sequence $N=2^n$. Or, in a more descriptive way, starting from 0, one may determine the integer number m indicating how many times it is needed to add a number k until one ends up at a same orthogonal sequence number (Haddamard sequence number) in the sequence.

If m is equal to the size $N=2^n$, then the subsampled sequence is maintained to be orthogonal. If it is lower than $N=2^n$, then the subsampled sequence will not be orthogonal. Since the same orthogonal sequence number repeats in the sequence after one orthogonal sequence has been completed which is every $N=2^n$ value, it is equal to find natural numbers p, m satisfying $$p \cdot 2^n = m \cdot k \quad p,n,m,k \in \mathbb{N} \qquad \text{Eq. 1}$$

and determine whether the minimal value for m which allows to solve equation 1 is equal to $2^n$.

Here, p indicates how many times the orthogonal sequence (Haddamard sequence) has been repeated until the first repetition occurs and m indicates the number which is required to obtain the same sequence number for a subsampling with a factor of k. If the minimal value for m is equal to $m_{min}=2^n$, then the subsampled sequence is orthogonal, if $m_{min}<2^n$ then it is not orthogonal.

Equation 1 can be written in the form $$\frac{m}{p} = \frac{2^n}{k}. \qquad \text{Eq. 2}$$

Assuming now k to be an even number, i.e. k can be written as k=2i, then Equation 2 can be written as $$\frac{m}{p} = \frac{2^n}{2 \cdot i} = \frac{2^{n-1}}{i} \qquad \text{Eq. 3}$$

By observing Eq. 3 one obtains for m:

$$m = \frac{2^n}{2 \cdot i} p = \frac{2^{n-1}}{i} p.$$

For taking the integer numbers p and i to be equal, on can realize that $m=2^{n-1}$ is a solution to equation 1. Therefore, $m_{min}<2^n$ is valid for even integer numbers k and the subsampled sequence is therefore not obtained orthogonal.

On the other hand, starting from Eq. 2 and assuming k to be an integer odd value, one can write k=2i+1, i being an integer. Eq. 2 can therefore be written as $$\frac{m}{p} = \frac{2^n}{2 \cdot i + 1} \qquad \text{Eq. 4}$$

Solving Eq. 4 for m results in:

$$m = \frac{2^n}{2i+1} p. \qquad \text{Eq. 5}$$

In Eq. 5, since $2^n$ divided by (2i+1) is not an integer, it is required that p divided by (2i+1) is an integer in order to allow m to be an integer. The lowest possible value for m is therefore obtained when $$\frac{p}{2i+1} = 1,$$

yielding as minimum $m_{min}=2^n$. Since this is the requirement for orthogonality it is shown that a continuous regular subsampling every $k^{th}$ element of the sequence is orthogonal if k is an odd integer value.

Figure 4A:
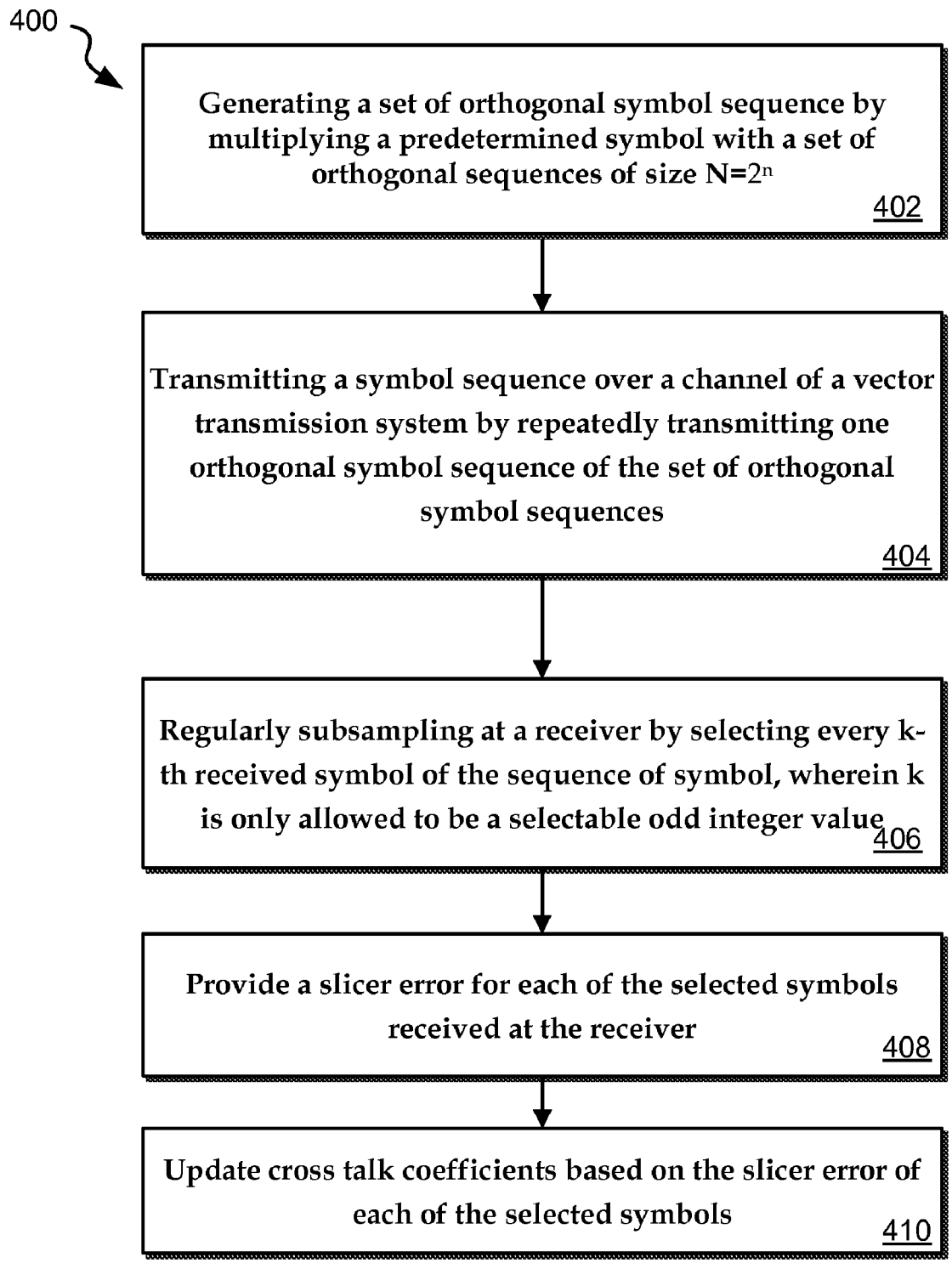
FIGS. 4a and 4b show chart diagrams according to embodiments.

In view of the above, one embodiment 400 of providing an updating of cross-talk coefficients in a vector transmission system is shown in FIG. 4a. In FIG. 4a, at 402 a set of orthogonal symbol sequences is generated by multiplying a set of orthogonal sequences of size $N=2^n$ with a predetermined symbol. As outlined above, n is here an integer value and the predetermined symbol can be any symbol for example a 4-QAM symbol. At 404, a symbol sequence is transmitted over a channel of the vector transmission system by repeatedly transmitting one orthogonal symbol sequence of the set of orthogonal symbol sequences. It is to be noted here that in addition to the one symbol sequence other symbol sequences are transmitted over other channels of the vector transmission system by repeatedly transmitting on a respective channel an orthogonal symbol sequence of the set of orthogonal symbol sequences as is shown for example in FIG. 3a. The repeatedly transmitted orthogonal symbol sequences is different for each channel since otherwise the requirement that an orthogonal symbol sequence transmitted on one channel is orthogonal to an orthogonal symbol sequence on another channel is not fulfilled.

At 406, a regularly subsampling is performed by selecting every $k^{th}$ received symbol (sampling factor k). Here k is allowed to be a selectable but odd integer value. In embodiments, k may be allowed to vary dependent on the requirements. The value of k may be in some embodiments be determined by a central unit such as the management unit shown in FIG. 1a.

At 408, a slicer error is provided for each of the selected (regularly subsampled) symbols received at the receiver. As outlined above, a slicer error may in embodiments include the full transmission error, i.e. a complex vector of any size, or may include only the sign of the transmission error.

At 410, cross-talk coefficients are updated based on the slicer error of each of the selected symbols. In one embodiment, the slicer error may be transmitted back from the receiver to the transmitter side. For example, in order to compensate FEXT in downstream direction, each of the second transceivers units 108 shown in FIG. 1a may determine the slicer error and transmit the slicer error back to the management unit for allowing updating of coefficients stored in the management entity 112. It is to be noted that in one embodiment the slicer may be immediately transmitted back. A dedicated channel may be used to transmit the slicer error back. In one embodiment, the slicer error is transmitted back as soon as the dedicated channel is free to transmit. In another embodiment, for each channel, slicer errors for a number of selected may be stored for a short time at the receiver side and then transmitted back together.

In some embodiments, no transmission over the vectored transmission system may be required for updating the cross-talk coefficients based on the slicer error. For example, for updating the FEXT coefficients in upstream direction, each of the first transceiver determines a respective slicer error as outlined above. In this case no transmission over the respective channels of the vector communication system is required since the first transceivers are located at the same side as the management entity 112 which performs the updating of the coefficients. It is to be noted that in the described embodiments, the receiver alone may determine the sampling factor k without informing the transceiver at the other side.

According to one embodiment, a subsampling factor may be predetermined or determined for example based on a desired or required update rate. In an operation mode where only odd subsampling factors are allowed in order to provide an orthogonal subsampled sequence, a desired or required subsampling factor may be calculated based on the desired or required update rate. If the desired or required subsampling factor is not obtained to be an odd integer, then the next lowest odd integer or the next higher odd integer may be selected.

In embodiments, a change of the update rate, i.e. a change of the subsampling factor may be provided on the fly.

According to one embodiment, a central unit such as the management unit 112 may determine the subsampling factor k for each vectored channel. The subsampling factor k is then transferred together with a starting index indicating the first symbol to be selected with the subsampling factor k to the corresponding transceivers, i.e. either transceivers 104 or transceivers 108 depending whether the subsampling factor k corresponds to upstream FEXT probing or downstream FEXT probing.

Having described now an embodiment for the size $N=2^n$ of obtaining an orthogonal sequence by continuously subsampling every $k^{th}$ sample with k being only allowed to be an integer, a further embodiment will be described for providing a set of subsampled orthogonal sequences by selecting symbols from each sequence based on a predetermined scheme.

For sampling with even integer factors p (for example 2, 4, 6 etc), a shift by one in the subsampling is required after a predetermined number of subsampled symbols as will be outlined below.

Starting with the above described requirement for orthogonality that the first repeated orthogonal sequence number of the subsampled symbols has to occur after $N=2^n$ subsampled symbols where N is the size of each orthogonal sequence, one can first determined the number of times a subsampling can occur with an even integer sampling factor k until the first repetition occurs and then shift the next symbol to be sampled by one. Since k is an even number, k can be written as $k=k1 \cdot 2^{n1}$ with k1 being an odd integer and n1 being an integer.

Inserting the above into Eq. 2, one obtains $$m = \frac{2^{(n-n1)} \cdot p}{k1}. \qquad \text{Eq. 6}$$

Since k1 is an odd integer and therefore not dividable by 2 without remainder, the smallest integer number for m is obtained when p is equal to k1 since then $$\frac{p}{k1} = 1.$$

One then observes that the smallest number of m is $m_{min} = 2^{(n-n1)}$. In other words, having determined the number n1, one can calculate the number $m_{min} = 2^{(n-n1)}$ after which the first repetition will occur. Having then sampled $m_{min} = 2^{(n-n1)}$, the next symbol to be regularly subsampled sequence is then shifted by one and thereafter again regularly subsampled with the even sampling factor $2^{(n-n1)}$ etc. The subsampling of $2^{(n-n1)}$ sequence symbols with subsampling factor k and then shifting the next symbol to be regularly subsampled by one has to be performed $2^{n1}$ times until all $2^n$ subsampled symbols of an orthogonal subsampled sequence are obtained.

Figure 3D:
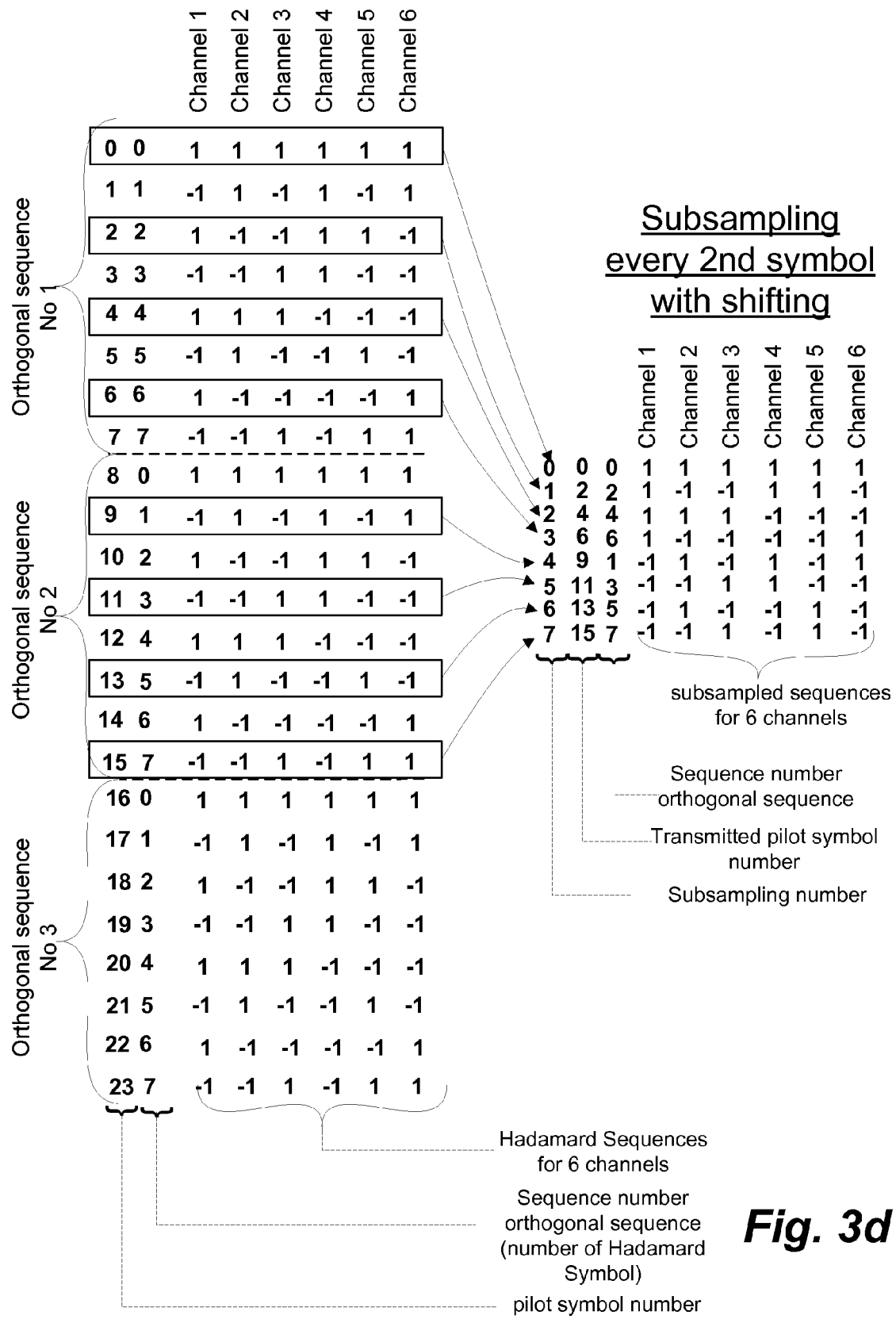

FIG. 3d shows for illustration purposes an embodiment implementing the above described scheme for a set of sequences based on the Hadamard matrix shown in FIG. 3a. In FIG. 3d, assuming a sampling factor of k=2, one determines in view of the above that n1=1 and therefore a shift will be performed after $2^2=4$ subsampled symbols. Thus, after subsampling 4 symbols, instead of providing the next regular symbol with sequence number 8, a shift of one symbol is provided such that the next sampled symbol is 8+1=9.

It can be easily seen in FIG. 3d that by providing subsampling with the above scheme, a subsampled sequence for one channel is orthogonal to a subsampled sequence of each other channel.

Figure 4B:
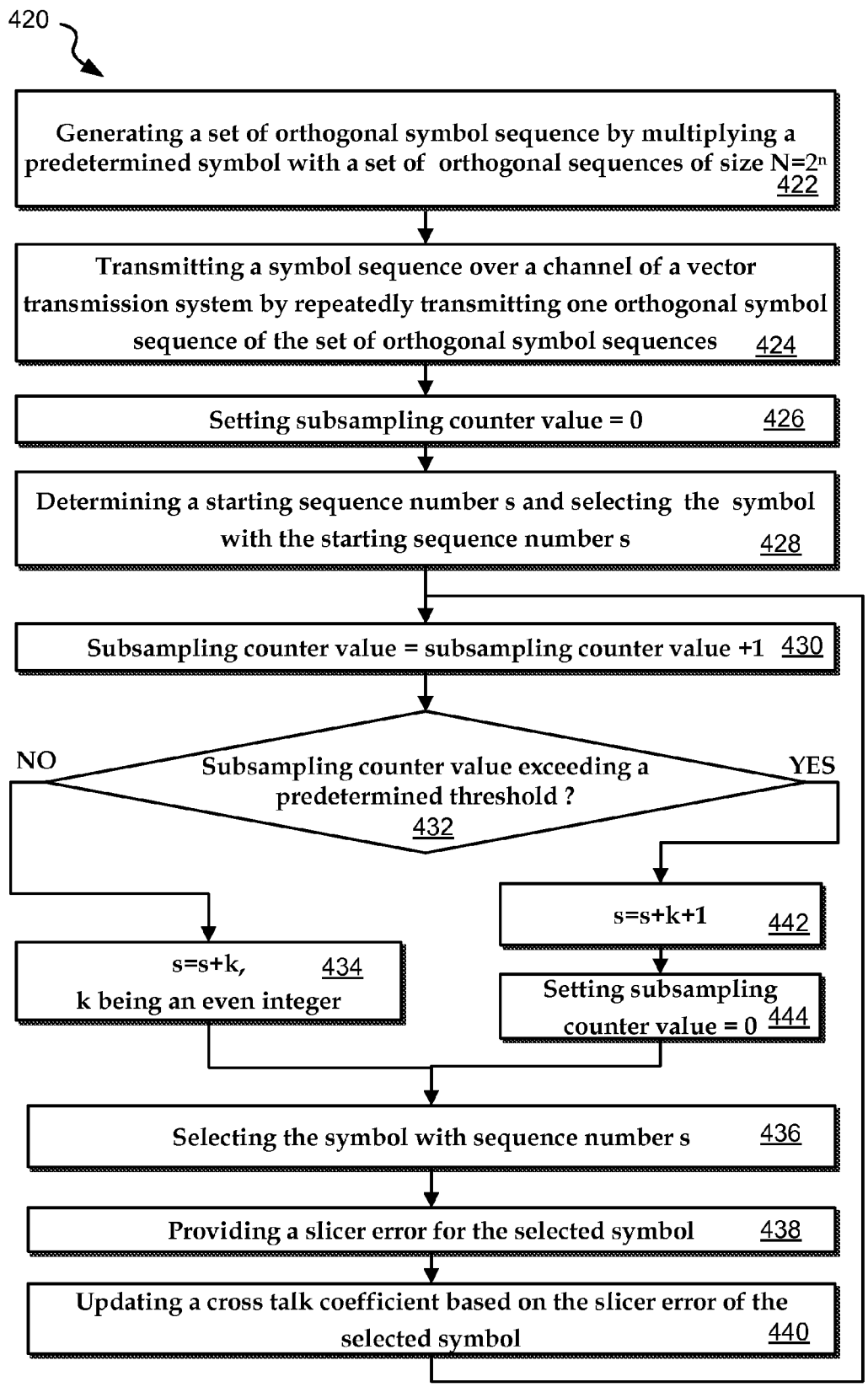

FIG. 4b shows a flow diagram illustrating an embodiment 420 for providing an updating of cross-talk coefficients in a vector transmission system implementing the above described subsampling scheme for even integer subsampling factors.

Starting at 422, a set of orthogonal symbol sequences is generated by multiplying a predetermined symbol with a set of orthogonal sequences of size $N=2^n$.

At 424, a symbol sequence is transmitted over a channel of a vector transmission system by repeatedly transmitting one orthogonal symbol sequence of the set of orthogonal symbol sequences. It is to be understood that other symbol sequences of the set of symbol sequences may be repeatedly transmitted on other channels of the vector transmission system.

At 426, a subsampling counter value is set to 0. At 428 a starting sequence number s is selected and the symbol having the starting sequence number is selected (subsampled).

At 430, the subsampling counter value indicating the number of selected symbols is increased by one.

At 432, it is determined whether the subsampling counter value exceeds a predetermined threshold. The predetermined threshold may be calculated by determining the integer number k1 which is the number of times, the subsampling factor k contains the factor 2 as described above.

If it is decided in 432 that the predetermined threshold is not exceeded, the flow diagrams continues at 434 by increasing the selection number s for the next symbol by the subsampling factor k. Then at 436, the symbol with sequence number s is selected and at 438 a slicer error is provided for the selected symbol. At 440, a cross-talk coefficient is updated based on the determined slicer error of the selected symbol.

The flow diagram then moves back to 430 where the subsampling counter value is increased again by one and thereafter to 432 where it is again determined whether the subsampling counter value exceeds the predetermined threshold.

If it is finally determined in 432 that the predetermined threshold is exceeded, the selection number s for the next symbol is increased by (k+1) which provides the shift by one symbol in the subsampling. Thereafter, the subsampling counter value is set to 0 and the process continues with 436, 438 and 440 as described above.

In the above, it is assumed to shift the subsampling of the next symbol by +1 compared to the expected regular sampled symbol. However, in other embodiments, other shifts by an odd number may be encompassed.

It is to be noted that the above described embodiment is one embodiment of implementing the selecting of every k-th symbol from the sequence of transmitted symbols, wherein k is an even integer number such that after selecting in the subsampling a predetermined number of symbols the next symbol is selected as the (k+1)th symbol counted from the previous selected symbol.

It is to be noted here that the scheme of continuously subsampling with odd subsampling factors without shifting can be combined with the subsampling with even subsampling factors and providing a shift. For example, in one embodiment, one of the above described schemes may be selected. Selection may for example be based on a required or desired or expected update rate. Since the higher the subsampling factor k is, the lower is the actual difference in the update rate for two subsequent factors k and k+1. Thus, the difference between the update rate between two subsequent odd and even values k and k+1 is small. Therefore, in one embodiment, when the subsampling factor is over a predetermined threshold, only an odd sampling factor may be selected by looking for the next appropriate odd value k.

Having described now embodiments wherein the size N of the orthogonal sequence is $2^n$, in the following an embodiment having a size $N=2^n-1$ will be described. As an example, sequence with size $N=2^n-1$ include m-sequences which are constructed to have this size.

For orthogonal sequence of size $N=2^n-1$, Eq. 1 may be modified to obtain:

$$p \cdot (2^n-1) = m \cdot k \quad p,n,m,k \in \mathbb{N} \quad \text{Eq. 7}$$

Assuming k to be an even integer, one can write k=2i and easily observe that $$m = \frac{2^n - 1}{2 \cdot i} p.$$

Since $2^n-1$ is an odd number, $2^n-1$ can not be divided by the integer number 2i. Therefore the requirement is that $$\frac{p}{2 \cdot i}$$

is an integer number. The smallest possible m is obtained for $$\frac{p}{2 \cdot i} = 1$$

for which m is obtained to be $m=2^n-1$ showing that the subsampling with an even subsampling factor k results in an orthogonal subsampled sequence.

Assuming k to be an odd integer, k can be written as k=2i+1. Equation 7 can then be reformulated to obtain $$m = \frac{2^n - 1}{2 \cdot i - 1} p$$

In many cases, $$\frac{2^n - 1}{2 \cdot i - 1}$$

will not be an integer and therefore $$\frac{p}{2 \cdot i - 1}$$

is requested to be an integer in order to determine valid solutions for Eq. 7. In these cases, similar to the above, the smallest number for m is determined by $$\frac{p}{2 \cdot i - 1} = 1$$

which yields as minimum $m_{min}=2^n-1$ which shows that the subsampled sequence is orthogonal. For example for k>N, i.e. for $i>2^{n-1}$, $$\frac{2^n - 1}{2 \cdot i - 1}$$

can not be an integer. Thus, for k>N and k being an odd integer, the subsampled sequence is always an orthogonal sequence.

Cases in which $$\frac{2^n - 1}{2 \cdot i - 1}$$

is an integer can be determined by observing $$\frac{2^n - 1}{2 \cdot i - 1} = \frac{2^n}{2 \cdot i - 1} - \frac{1}{2 \cdot i - 1}.$$

Since the later term can not be an integer except for the trivial case of i=1 (k=1, i.e. sampling every symbol), in order to have $$\frac{2^n}{2 \cdot i - 1} - \frac{1}{2 \cdot i - 1}$$

being an integer the following must apply:

$$2^n \bmod (2i-1) = 2^n \bmod(k) = 1.$$ Eq. 8

These cases are rare. If Eq. 8 would apply, the sequence would repeat after $m_{min}$ symbols, wherein $m_{min}$ can be determined for p=1 to be $$m_{min} = \frac{N}{k} = \frac{2^n - 1}{2i - 1}.$$

In case n and k are desired such that Eq. 8 would be valid, according to one embodiment an even integer k+1 or k−1 next to k may be selected to obtain an orthogonal sequence. In another embodiment, if Eq. 8 would be valid, one may use the scheme of shifting one symbol (or other numbers of symbols) after $$m_{min} = \frac{N}{k}$$

symbols are selected as described with respect to FIGS. 3d and 4b.

Taking in view of the described embodiments a system into account wherein the orthogonal sequences are allowed to be either Haddamad sequences which always have a size of $N=2^n$ as well as m-sequences which always have a size of $N=2^n-1$, it is to be noted that regularly and continuously subsampling with an odd sampling factor k may allow for both cases to obtain subsampled sequences which are orthogonal except for the rare cases outlined above for $N=2^n-1$ fulfilling k<N and $2^n \bmod(k)=1$.

Subsampling regularly and continuously with a subsampling factor k being an even integer number, it can be seen that for $N=2^n-1$ always orthogonal sequences are obtained while for $N=2^n$ no orthogonal sequences are obtained and the scheme of shifting by one (or other predetermined numbers of symbols) may be used as outlined with respect to FIGS. 3d and 4b.

In view of the above, according to an embodiment, the size N of the orthogonal symbol sequence may be determined and the continuous and regular selecting of every k-th symbol from the sequence of transmitted symbols until at least N symbols are selected may be performed thereafter. If the size N is determined to be $2^n-1$, k is selectable from an odd or even integer number. If the size N of the orthogonal symbol sequence is determined to be $2^n-1$ with n being an integer number, the regular continuous subsampling with subsampling factor k may only be performed when k is an odd integer. Then k is an integer number selectable only from odd integer numbers. Here, if k is required or desired to be an even number, either the next odd integer number may be chosen or the above shifting scheme may be performed.

In other words, according to one embodiment, by determining a size N of the orthogonal sequence and selecting a desired or requested subsampling factor k, the continuous regular sampling with subsampling factor k (continuously subsampling every kth symbol) is only performed it it has been determined or calculated for the selected subsampling factor k and the determined size N that for each symbol of the orthogonal symbol sequence, after selecting said symbol all other symbols of the orthogonal symbol sequence are selected before said symbol is again selected. Or in other words, N subsequently selected symbols contain all symbols (all symbol numbers) of the orthogonal symbol sequence. If this is not the case, a new subsampling factor k may be selected according to one embodiment. According to another embodiment a non-continuous subsampling with the shifting scheme described with respect to FIGS. 3d and 4b may be selected.

For DMT systems, since the subcarriers are independent, the above described updating may in embodiments be provided independently for each subcarrier.

Figure 6:
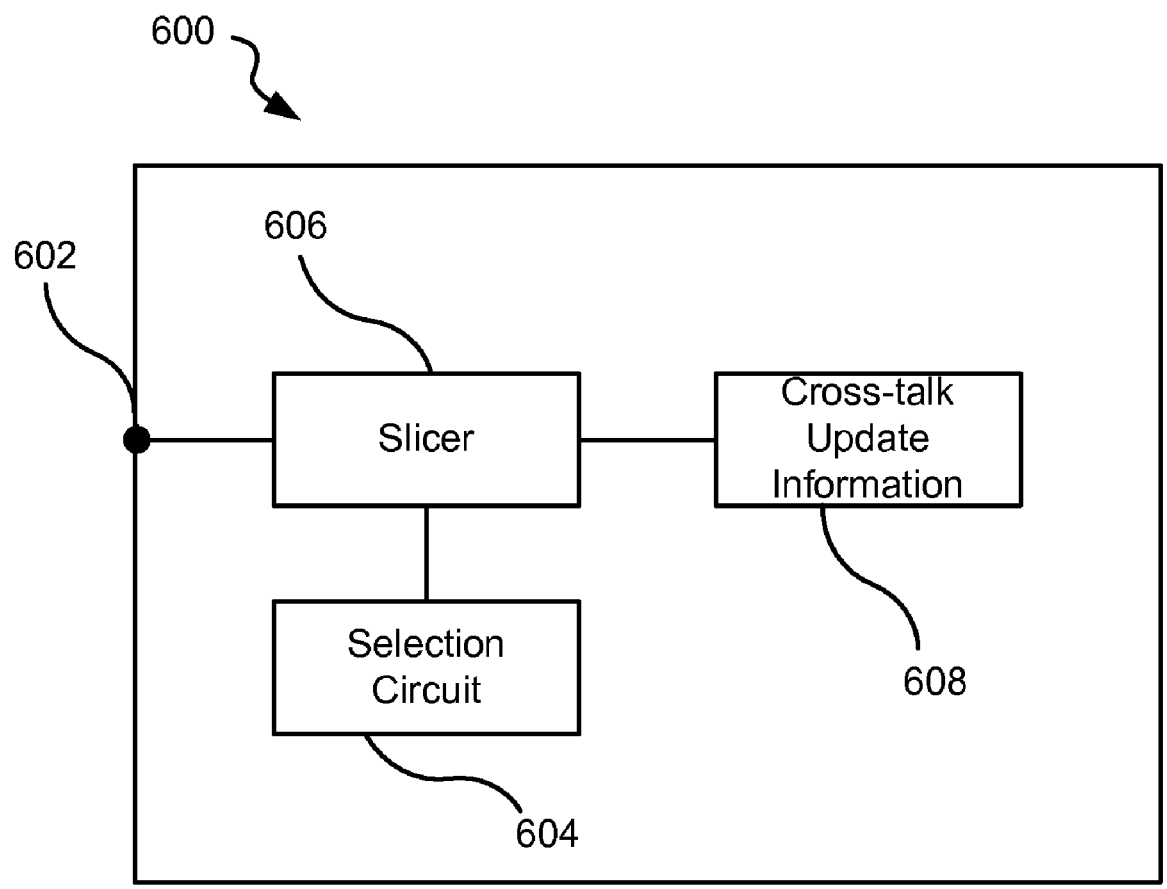
FIG. 6 shows a device according to an embodiment.

Referring now to FIG. 6, an embodiment of a device 600 which may be implemented in a transceiver such as any of the transceivers 104 and 108 in order to allow a selection of symbols for cross-talk updating will be described. The device 600 includes an input 602 configured to receive a sequence of symbols transmitted in a vector transmission system by a first transceiver of the vector transmission system. As described above, the sequence of symbols is based on a modulation of a predetermined symbol with an orthogonal sequence. For example, the sequence of symbols may be generated by repeatedly transmitting an orthogonal sequence which is constructed by a multiplication of a predetermined symbol with an orthogonal sequence. The device further comprises a selection circuit 604 configured to select a subset of the received symbols of the sequence as described above. A slicer 606 is provided in the device 600 and is configured to generate a slicer error for each symbol of the subset selected by the selection circuit. Device 600 further includes a circuit 608 configured to transmit cross-talk update information to a management unit 112. The cross-talk update information may be the slicer error or may be other information derived from the slicer error. In embodiments, the cross-talk update information may be transmitted to the management unit over a channel of the vector transmission system. In another embodiment, when the device 600 is implemented on the same side as the management unit, other transmission paths or transmission lines such as cables or metal lines connecting the transceivers 104 with the management unit may be used.

Figure 7:
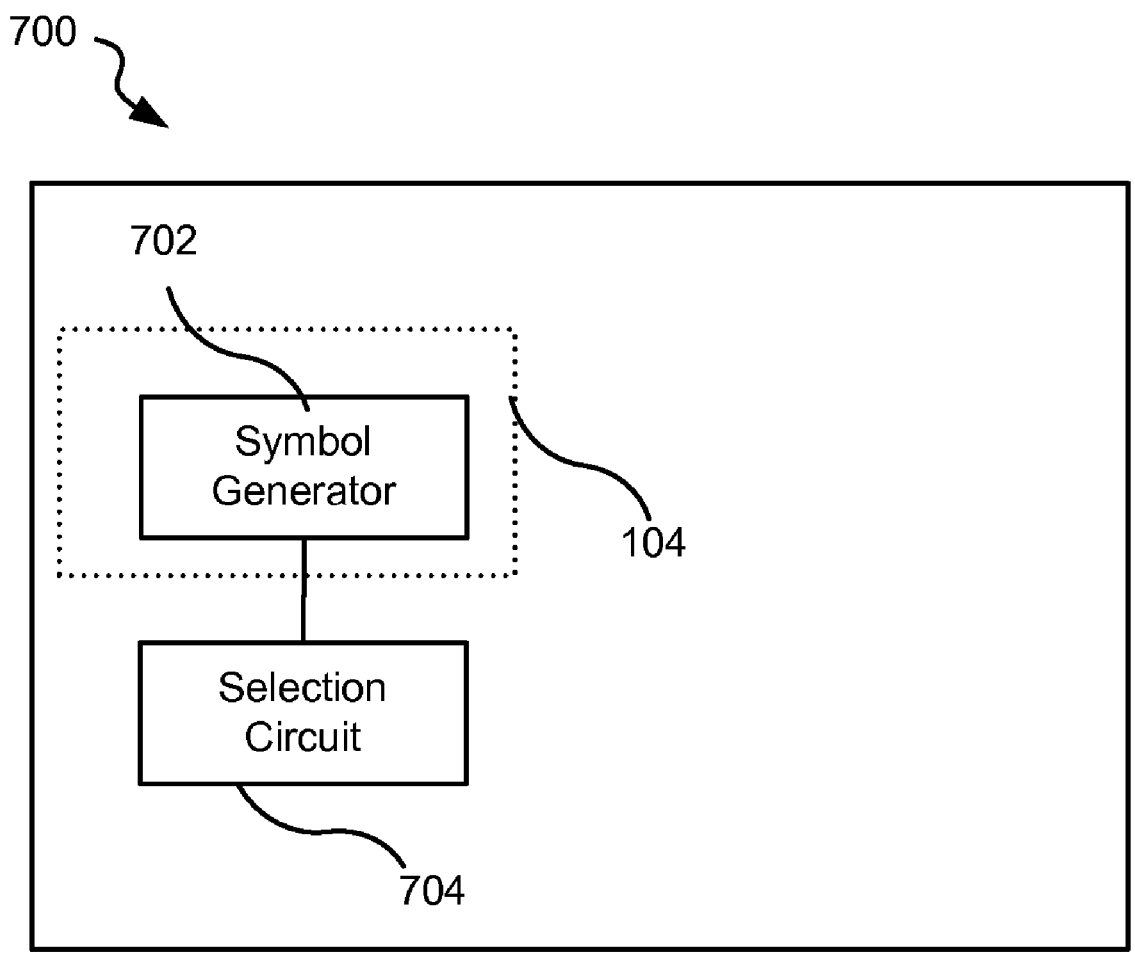
FIG. 7 shows a vector transmission device according to an embodiment.

A further embodiment of a vector transmission device 700 will now be described with respect to FIG. 7. Device 700 includes a symbol generator 702 configured to generate the symbol sequence based on a modulation of a predetermined symbol with an orthogonal sequence as described above. As indicated in FIG. 7, the symbol generator 702 may be provided in one of the transceivers 104 shown in FIG. 1. Device 700 further includes a selection circuit 704 configured to provide selection information indicating which symbols of the sequence of symbols are to be used for updating cross-talk coefficients and which symbols of the sequence of symbols are not to be used for updating cross-talk coefficients. The selection information is provided to the transceivers 104 and/or to the transceivers 112 (which are not shown in FIG. 7) for allowing the transceivers to provide a selection of the received symbols as described above.

In the above description, embodiments have been shown and described herein enabling those skilled in the art in sufficient detail to practice the teachings disclosed herein. Other embodiments may be utilized and derived there from, such that structural and logical substitutions and changes may be made without departing from the scope of this disclosure.

This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation such as an analog signal representation, a digital signal representation, a modulation onto carrier signals etc. Furthermore the terms "coupled" or "connected" may be interpreted in a broad sense not only covering direct but also indirect coupling.

It is further to be noted that embodiments described in combination with specific entities may in addition to an implementation in these entity also include one or more implementations in one or more sub-entities or sub-divisions of said described entity. For example, specific embodiments described herein described herein to be implemented in a transmitter, receiver or transceiver may be implemented in sub-entities such as a chip or a circuit provided in such an entity.

The accompanying drawings that form a part hereof show by way of illustration, and not of limitation, specific embodiments in which the subject matter may be practiced.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended.

It is further to be noted that methods disclosed in the specification or in the claims may be implemented by devices having features such as means or circuits configured to perform each of the respective steps of these methods.

What is claimed is:

1. A method comprising:
    transmitting in a vector transmission system a sequence of symbols from a first transceiver to a second transceiver, the sequence of symbols comprises only symbols of an orthogonal symbol sequence, the orthogonal symbol sequence being multiple times repeated in the symbol sequence, the orthogonal symbol sequence being based on a modulation of a predetermined symbol with the orthogonal sequence;
    selecting symbols from the sequence of transmitted symbols for providing far-end cross-talk update information, the selected symbols being a subset of the transmitted symbols, the selecting including:
        selecting a symbol; and
        selecting all other symbols of the orthogonal symbol sequence before selecting said symbol again;
    providing far-end cross-talk update information based on a transmission error of a respective selected symbol received at the second transceiver.

2. The method according to claim 1, wherein providing far-end cross-talk update information includes providing a slicer error for each of the selected symbols, the method further comprising updating far-end cross-talk coefficients based on the slicer error of the selected symbols.

3. The method according to claim 1, further comprising:
    switching from a first operation mode to a second operation mode,
    wherein far-end cross-talk update information is provided based on each symbol of the transmitted sequence of symbols in the first mode and wherein selecting symbols from the sequence of transmitted symbols for providing far-end cross-talk update information is provided in the second mode.

4. The method according to claim 1, wherein the orthogonal sequence is a Hadamard sequence or a m-sequence.

5. The method according to claim 1, wherein the sequence of symbols is a sequence of SYNC-Symbols, each SYNC symbol corresponding to a respective DSL super-frame.

6. The method according to claim 1, wherein selecting symbols from the sequence of transmitted symbols for providing far-end cross-talk update information comprises:
    selecting a subsampling factor k from a set of numbers containing only odd integer numbers; and
    selecting every k-th symbol from the sequence of transmitted symbols.

7. The method according to claim 1, wherein selecting symbols from the sequence of transmitted symbols for providing far-end cross-talk update information comprises:
    determining a size N of the orthogonal symbol sequence; and selecting every k-th symbol from the sequence of transmitted symbols until at least N symbols are selected,
        wherein k is selectable from an odd or even integer number if the size N of the orthogonal symbol sequence is determined to be $2^n-1$ with n being an integer number, and
        wherein k is selectable only from odd integer numbers if k is determined to be $2^n$.

8. The method according to claim 1,
    wherein selecting symbols from the sequence of transmitted symbols comprises repeatedly performing the following:
        selecting every k-th symbol from the sequence of transmitted symbols, wherein n is an even integer number; and
        after selecting a predetermined number of symbols, selecting the next symbol as the (k+1)th symbol counted from the previous selected symbol.

9. The method according to claim 1, wherein selecting the symbols generates a subsampled symbol sequence, wherein the subsampled sequence is an orthogonal symbol sequence.

10. The method according to claim 1, further comprising:
providing for each channel of a plurality of channels an orthogonal symbol sequence associated with the respective channel such that an orthogonal symbol sequence associated with a respective channel is orthogonal to each orthogonal symbol sequence associated with another channel of the plurality of channels, each respective orthogonal symbol sequence being determined by a multiplication of a predetermined symbol with an orthogonal sequence of a set of orthogonal sequences associated with the respective channel;
transmitting on each channel a respective symbol sequence by repeatedly transmitting the orthogonal symbol sequence associated with the respective channel; and
selecting for each channel of the plurality of channels symbols from the transmitted symbol sequence such that after selecting one symbol of the respective orthogonal symbol sequence all other symbols of the orthogonal symbol sequence are selected before said symbol is again selected.

11. The method according to claim 10, further comprising:
selecting for each channel the symbols by selecting every kth symbol of the respective transmitted symbol sequence.

12. The method according to claim 11, wherein each orthogonal symbol sequence has a size of N symbols, the method further comprising for each channel of the plurality of channels:
determining a size N of the orthogonal sequence at a respective receiver; and
selecting a subsampling factor k;
determining whether for the selected subsampling factor k and the determined size N after selecting one symbol of the respective orthogonal symbol sequence all other symbols of the orthogonal symbol sequence are selected before said symbol is again selected; and
selecting a new subsampling factor k, if it is determined that not all other symbols of the orthogonal symbol sequence are selected before said symbol is again selected.

13. A device comprising:
an input configured to receive a sequence of symbols transmitted in a vector transmission system by a first transceiver of the vector transmission system, the sequence of symbols being based on a modulation of a predetermined symbol with an orthogonal sequence;
a selection circuit configured to select a subset of the transmitted sequence of symbols, including:
select a symbol from the transmitted sequence of symbols;
select all other symbols from the transmitted sequence of symbols before selecting said symbol again; and
the selection circuit is configured to select symbols by repeatedly performing the following:
selecting a symbol;
discarding a predetermined number of symbols which follow the selected symbol in the sequence; and
selecting a further symbol after discarding the predetermined number of symbols;
a slicer to generate a slicer error for each symbol of the selected subset; and
a circuit to provide far-end cross-talk update information by utilizing a slicer error of a respectively selected symbol.

14. The device according to claim 13, further configured to selectively switch from a first mode to a second mode, the device being further configured to provide the far-end crosstalk update information in the first mode based on a slicer error of each symbol of the transmitted sequence of symbols and to provide the far-end cross-talk update information in the second mode based only on the slicer error for the symbols contained in the selected subset of symbols.

15. The device according to claim 13, wherein the orthogonal sequence is a Hadamard sequence or a m-sequence and the predetermined symbol is a SYNC symbol associated with a DSL super-frame.

16. The device according to claim 13, wherein the selection circuit is configured to select symbols from the sequence of symbols by selecting every k-th symbol from the sequence of symbols, wherein k is a selectable odd integer number.

17. A vector transmission device comprising:
a symbol generator configured to generate a sequence of symbols, the sequence of symbols based on a modulation of a predetermined symbol with an orthogonal sequence; and
a selection circuit configured to provide selection information indicating which symbols of the sequence of symbols are to be used for updating far-end cross-talk coefficients and which symbols of the sequence of symbols are not to be used for updating far-end cross-talk coefficients, including:
selecting a symbol from the sequence of symbols; and
selecting all other symbols from the sequence of symbols before selecting said symbol again
wherein the selection circuit is configured to select the symbols by selecting every kth symbol from the sequence of symbols, wherein k is only an odd integer number.

18. The vector transmission device according to claim 17, further configured to selectively switch from a first mode to a second mode, the device being further configured to provide far-end cross-talk update information in the first mode based on a slicer error of each symbol of the transmitted sequence of symbols and to provide far-end cross-talk update information in the second mode based on a slicer error of only the symbols of the selected subset.

19. The vector transmission device according to claim 17, wherein the orthogonal sequence is a Hadamard sequence or a m-sequence and the symbol is a SYNC symbol associated with a DSL super-frame.

20. A vector transmission system comprising:
a first transceiver, comprising a symbol generator configured to generate a sequence of symbols representing a multiplication of a predetermined symbol with an orthogonal sequence;
a selection circuit configured to indicate symbols of the sequence of symbols which are selected for a far-end cross-talk compensation update, including selecting a symbol from the sequence of symbols and selecting all other symbols from the sequence of symbols before selecting said symbol again, the selection circuit is configured to select symbols from the sequence of symbols by selecting every k-th symbol from the sequence of symbols, wherein k is a selectable odd integer number;
a second transceiver, the second transceiver comprising:
an input configured to receive the sequence of symbols, and
a slicer configured to provide a slicer error for the symbols indicated to be selected for far-end cross-talk compensation update; and
an update circuit configured to update far-end cross-talk coefficients based on the slicer error of the selected symbols.

21. The vector transmission system according to claim 20, wherein the vector transmission system is configured to selectively switch from a first mode to a second mode, wherein further, the second transceiver is further configured to provide updating of cross coupling coefficients in the first mode based on each symbol of the transmitted sequence of symbols and to provide updating of cross coupling coefficients in the second mode based on the symbols of the selected subset.

* * * * *